United States Patent Office 3,063,810
Patented Nov. 13, 1962

3,063,810
PROCESS FOR THE PRODUCTION OF DIBORANE
Roland Köster, Mulheim (Ruhr), and Hermann Buechl, Hildesheim, Germany, assignors to Studiengesellschaft Kohle m.b.H., Mulheim (Ruhr), Germany
No Drawing. Filed July 12, 1957, Ser. No. 671,390
Claims priority, application Germany July 14, 1956
9 Claims. (Cl. 23—204)

This invention relates to a process for the production of diborane.

Various processes for the production of diborane $B_2H_6$ have already been proposed, but so far none has been satisfactory for inexpensive production on a technical scale. Production has hitherto taken place substantially in accordance with one or other of two processes:

(1) By reaction of a boron halide with an alkali metal hydride, and
(2) By the action of a boron halide on an alkali metal borohydride.

Neither process is satisfactory. The reaction of, for example, boron fluoride with a solid alkali metal hydride does not take place readily when the reactants are combined and in fact the initiation of the reaction is impeded. It is therefore necessary to work under pressure and in the presence of suspension agents for the hydride and as a result very unpleasant sudden reactions frequently occur. It is true that the particular case of the reaction between lithium borohydride and boron fluoride in accordance with the equation $3LiBH_4+BF_3=3LiF+2B_2H_6$ is easier to control, but the production of lithium borohydride is not entirely simple and economically it is not very advantageous, since an expenditure of altogether 4 molecules of lithium hydride LiH is necessary in order to produce 1 molecule of $LiBH_4$ from $BF_3$ or from boric acid esters and 1 mol of diborane consequently necessitates an expenditure of, altogether, 6 mols of lithium hydride, which is a comparatively expensive substance. On the other hand, the replacement of the lithium borohydride by sodium borohydride does not provide any advantages, since the production of sodium borohydride is more complicated than that of lithium borohydride and in addition the final reaction with boron fluoride does not take place very smoothly. The reaction with the lithium hydride was carried out in the presence of ether via a large number of intermediate stages and is highly exothermic. As long as insufficient $LiBH_4$ intermediately formed is present, a tedency to violent or even completely uncontrollable sudden reactions exist, jeopardizing operational safety in technical production. In addition there is the great sensitivity to moisture, and the spontaneous combustibility connected therewith, of the starting materials used, which are usually in powder form according o the known process and which as solid substances, are moreover capable of being dispensed satisfactorily only by way of solutions or suspensions.

It has now been found that diborane can be produced very easily and smoothly if a borazane of the general formula $BH_3NR_3$, in which R represents an alkyl, alkaryl or aryl group, is reacted with a Lewis acid which is stronger than the Lewis acid borine.

The borazanes are sometimes liquid or sometimes solid borine aminates, in which the monomeric boron hydride borine, in its property as a so-called Lewis acid, is combined with tertiary amine, and in addition are stable, even with respect to moisture. Compounds in which borine is combined with ammonia or a primary or secondary amine are not suitable for such reactions owing to their great sensitivity to temperature.

Lewis acids are substances which are acids in the sense of the conventional definition but which in addition do not contain a proton (cf. L. F. Fieser, "Lehrbuch der organischen Chemie," Verlag Chemie, page 148 et seq).

By reacting borazanes, according to the invention, with Lewis acids which are stronger than borine itself, monomeric boron hydride is liberated and is immediately dimerised in known manner to provide the gaseous diborane. After driving off the diborane in the usual manner, for example by heating, subsequent compression or condensation, the acid introduced can be recovered as an addition compound with the basic tertiary amine.

The use of boron halides, especially boron fluoride, as Lewis acids has proved to be particularly satisfactory in practice. The boron fluoride can also be used in the form of the liquid boron fluoride-ether compound which is easy to handle, and if necessary also as a thioether, an ether being thereby obtained additionally as a secondary product. It is of course also possible to use gaseous boron fluoride. In this case, however, care must be taken that no excess boron fluoride is introduced into the reaction mixture. It is also possible to work in the presence of the readily available liquid boron trifluoride-diethyl etherate $(BF_3.(C_2H_5)_2O)$, which can be satisfactorily processed. When working in the presence of $AlCl_3$, the yield of diborane is lowered, since the boron hydride partially reduces the aluminium trichloride to aluminium hydride. The process can be carried out in the presence of solvents, for example in the presence of ethers, hydrocarbons, or tertiary amines, with respect to which the reaction components and products are inert or form therewith labile addition compounds.

According to one particular feature of the invention, it has been found that the production of diborane can be carried out particularly easily and economically by a combination process:

(1) It is advisable to work in such manner that an aluminium trialkyl is initially produced in known manner from aluminium, hydrogen and any desired hydrocarbon, more especially an olefine, for example ethylene, propylene, butene-1, or isobutylene (cf. Belgian Patent No. 535,235). The aluminium compounds which are produced, and more especially the aluminium trialkyls, should advantageously not contain any dialkyl aluminium hydrides.

$$Al+1\tfrac{1}{2}H_2+3C_nH_{2n}=Al(C_nH_{2n+1})_3$$

(2) Boron fluoride is then caused to act on the aluminium trihydrocarbon which is obtained. The boron fluoride can in this case also be used in the form of its molecular compound with a tertiary amine, for example triethylamine, whereby the economy of the combination process is further improved.

(3) The mixture of boron trihydrocarbon and tertiary amine which is obtained can then be treated under pressure with hydrogen, whereby borazanes of the general formula, more especially trialkyl borazanes, for example $(C_2H_5)_3N.BH_3$, are obtained in a smooth reaction together with 3 molecules of hydrocarbon, more especially the saturated hydrocarbons $C_nH_{2n+2}$ (R. Köster, Angewandte Chemie 69, 94 (1957), "A Simple Synthesis of N-Trialkyl Borazanes").

(4) The borazanes, more especially trialkyl borazanes, are then treated according to the invention with boron fluoride, whereby diborane is liberated in accordance with the equation $$(C_2H_5)_3N.BH_3+BF_3=\tfrac{1}{2}B_2H_6+(C_2H_5)_3N.BF_3$$

When using molecular compounds of boron fluoride with tertiary amines, the trialkyl compound of boron fluoride is recovered in this stage of the process, and the said compound can be used again in the second stage of the process without being separated from the boron alkyls.

The combination of the four separate reactions of the process can be expressed by the following reaction equation:

$$BF_3 + Al + 3C_nH_{2n} + 3H_2 = \tfrac{1}{2}B_2H_6 + AlF_3 + 3C_nH_{2n+2}$$

This combination of the four different stages of the process at first seems to be complicated, but they proceed so smoothly that diborane is obtained in an excellent yield. The substances occurring in the different reaction stages as intermediate products are liquids or gases, such as the boron fluoride. The reactions of stages 2 and 4 occur at once simply upon combining the reactants. The reactions of the first and third stages are pressure reactions which can be carried out substantially quantitatively without any difficulty. The trialkyl amine introduced is not consumed, but is merely an auxiliary substance. The aluminium and the olefines are actually consumed but when the process is carried out on a large technical scale, aluminium fluoride is not a valueless waste product, but a substance for which a certain need exists, for example in the production of aluminium, whereby some of the cost of the process can be recovered. Moreover, the paraffins which are also formed can be put to known uses, for example as an engine fuel.

The end product diborane obtained according to the invention is a very highly explosive gas in admixture with air, and increasing interest is being shown in this product on account of its abundance of energy.

The following examples further illustrate the invention:

Example 1

$$BH_3.N(C_2H_5)_3 + BF_3.OR_2 = \tfrac{1}{2}B_2H_6 + BF_3.N(C_2H_5)_3 + OR_2$$

115 g. (1.0 mol) of N-triethyl borazane are placed in a nitrogen atmosphere in a 500 cc. glass flask provided with a stirrer mechanism (magnetic stirrer), thermometer, dropping funnel and reflux condenser. A cooling trap kept at $-15°$ C. and another trap cooled by liquid air are connected by way of ground glass joints to this apparatus. It is advisable to maintain a slight negative pressure (about 400 mm. Hg) throughout the apparatus during the reaction. 142 g. (1.0 mol) of boron fluoride etherate $BF_3O(C_2H_5)_2$ are slowly added dropwise to the borazane over approximately 2 hours. The temperature is slowly raised from room temperature, so that it reaches about 80° C. towards the end of the dropwise addition. The contents of the apparatus are then heated for another hour at 100–120° C. The gas ($B_2H_6$ and diethyl ether) escaping before starting the addition of boron fluoride etherate is collected in the two cooling traps; no hydrogen is formed. In the liquid air cooling trap the diborane is recovered in crystallised form (about 70% of theoretical quantity), while the other cooling trap contains the main proportion of the ether distilled off, with diborane $B_2H_6$ combined or dissolved therein. Another 20–25% of the expected quantity of $B_2H_6$ can be isolated therefrom by fractional distillation.

Diborane can be checked very satisfactorily as regards quality and quantity, in that it is converted back into the borazane by introducing it into triethylamine; the borazane has a characteristic melting point (4° C.) and boiling point (100/1° C. at 14 mm. Hg) which can easily be checked.

Assuming that pure borazane is used as starting material, the total yield in the reaction described is quantitative.

Instead of using boron fluoride etherate, it is of course also possible to use gaseous boron fluoride. In this case, it is merely necessary to ensure, particularly towards the end of the reaction, that no excess boron fluoride has been introduced into the reaction mixture, since otherwise the diborane $B_2H_6$ would be contaminated with boron fluoride. Consequently, it is advisable to break off the reaction after about 90% of the necessary quantity of boron fluoride has been introduced.

Example 2

$$BF_3.N(C_2H_5)_3 + Al(C_2H_5)_3 = B(C_2H_5)_3 + N(C_2H_5)_3 + AlF_3$$

The residue from Example 1 consists of 169 g. (1.0 mol) of boron trifluoride-triethylaminate $BF_3.NR_3$. After adding 200 cc. of α-methyl naphthalene as diluent to the liquid compound (M.P.=29.5° C.), 114 g. (1.0 mol) of aluminium triethyl is added thereto dropwise while stirring at 150–180° C. and over a period of 2 to 3 hours. The boron triethyl formed in the exothermic reaction distils off together with the triethylamine liberated; towards the end of the addition, the temperature is raised for a short time to 200° C. and the remainder of the boron triethyl and triethylamine is extracted in vacuo (90% yield). After changing the receiver, the solvent is recovered by vacuum distillation; dry aluminum fluoride is found in the residue.

Example 3

$$B(C_2H_5)_3.N(C_2H_5)_3 + 3H_2 = BH_3.N(C_2H_5)_3 + 3C_2H_6$$

The distillate obtained according to Example 2 consists of boron triethyl and triethylamine in the mol ratio 1:1. 10 g. of dry triethylamine (to compensate for losses) are added to 1784 g. of this mixture and the mixture is heated to 180–200° C. in a 5-litre roller-type autoclave under 200 atm. of hydrogen (room temperature). The pressure initially rises to about 330 atm. and then drops within 5 hours to 150 atm. More hydrogen is introduced under pressure at 250 atm. and heating is continued for another 3 hours at 190° C. Thereafter, the pressure remains constant, in spite of the presence of excess hydrogen. The autoclave is cooled, the pressure falling to about 60 atm. After blowing off the hydrogen and the ethane which is formed, 1020 g. of N-triethyl borazane are discharged in liquid form from the autoclave. Generally, the borazane obtained in this manner is already sufficiently pure and can be reacted as described in Example 1 to form diborane $B_2H_6$ in a good yield.

Example 4

345 g. (3 mols) of N-triethyl borazane are disposed in a 1 litre three-necked flask (stirrer, thermometer branch, gas inlet pipe) with a connected reflux condenser and two cooled traps (the first cooled to $-15°$ C. and the second cooled by liquid air). The flask is heated while stirring to 60–80° C. and altogether 190 g. (2.8 mols) of boron trifluoride (diluted with a little nitrogen or argon) are introduced over about 3 hours. Diborane is liberated and condensed in the second trap. Altogether, 37 g. of diborane (95% of the theoretical, base on the introduced $BF_3$) are obtained. Boron trifluoride-triethylaminate, which on cooling to room temperature solidifies as colourless crystals (M.P.=29.5° C.), is obtained as a residue.

Example 5

In a reaction flask having a capacity of about 60 ml. and constructed with two branches which are at an angle of about 60° C. to one another, one of the branches is charged with 2.6 g. of N-triethyl borazane (($C_2H_5)_3NBH_3$ M.B.P. 101° C. $_{14\,mm.}$) and the other with about 5 g. of boron trifluoride etherate ($BF_3.(C_2H_5)_2O$ M.B.P. 51° C. $_{12\,mm.}$). The flask is then closed with a rubber plug drilled with two holes. A closable pipe for nitrogen is led into the flask through one hole. Flexibly connected to the flask is a gas discharge device which extends outwardly by way of a short effective reflux condenser, a cooling trap using ice and common salt and a second trap with liquid nitrogen as coolant. The complete apparatus is now thoroughly flushed with nitrogen and the nitrogen pipe is shut off. By raising one of the branches, the two reactants are gradually combined in the other branch. Gaseous diborane is librated violently in an exothermic reaction, escapes and is condensed in the second cooling trap. Finally, the branch in which the reaction takes place is heated and the last traces of the diborane formed are displaced with nitrogen. Solvent vapours (either in this case) condense either in the reflux condenser or in the first cooling trap. In this way, very pure diborane is obtained in a yield of more than 90% of the theoretical. Boron trifluoridetriethylaminate ($BF_3 \cdot N(C_2H_5)_3$), remains as secondary product in the form of a syrupy mass.

*Example 6*

Using the same apparatus as in Example 5, 2.6 g. of N-triethyl borazane and 5 g. of boron trifluoride etherate, each dissolved in 5 ml. of ether or xylene, are reacted with one another The reaction is completed by gentle boiling of the solvents which are used.

Yield: 93% of the theoretical quantity of diborane.

*Example 7*

2.5 g. of N-triethyl borazane dissolved in 5 ml. of xylene, and 3.5 g. of boron trichloride ($BCl_3$ M.B.P. 18° C.) dissolved in 5 ml. of xylene, are reacted with one another according to the procedure of Example 2. Yield: 92% of the theoretical quantity of diborane.

*Example 8*

2.8 g. of N-dimethyl cyclohexyl borazane $$((CH_3)_2C_6H_{11}N \cdot BH_3 \text{ M.M.P. } 49° \text{ C.})$$

dissolved in 5 ml. of xylene, and 5 g. of boron trifluoride etherate dissolved in 5 ml. of xylene, are combined according to the procedure of Example 2 and reacted.

Yield: 85% of the theoretical quantity of diborane.

*Example 9*

2.5 g. of N-triethyl borazane dissolved in 5 ml. of ether, and 4 g. of aluminium chloride dissolved in 5 ml. of ether, are reacted under nitrogen in the apparatus described in Example 1 and the ether is boiled to complete the reaction.

Yield: 40% of the theoretical quantity of diborane.

*Example 10*

2.3 g. of N-triethyl borazane and 11.34 g. of nitric acid (d.=1.5) are carefully combined with one another in an open dish. Diborane is spontaneously formed, but owing to the presence of active oxygen from the nitric acid, it is immediately further oxidised with fire phenomenon and formation of large quantities of gas, corresponding substantially to the equations $$2(C_2H_5)_3N \cdot BH_3 + 2HNO_3 \rightarrow [2(C_2H_5)_3N \cdot H \cdot NO_3 + B_2H_6]$$
$$[2(C_2H_5)_3NH \cdot NO_3 + B_2H_6] + 16HNO_3 \rightarrow$$
$$12CO_2 + 27H_2O + 10N_2 + B_2O_3$$

*Example 11*

A mixture similar to that of Example 10 with 2.7 g. of N-dimethyl cyclohexyl borazane and 14 g. of nitric acid (d.=1.5) reacts in similar manner.

The fact that the reaction proceeds in this sense is also shown from the course of the reaction with an oxygen-free mineral acid, such as for example hydrochloric acid. Thus, if 2.3 g. of triethyl aminoborazane are reacted with heating with about 10 g. of concentrated hydrochloric acid, diborane is formed as well as triethyl ammonium chloride, the diborane being spontaneously hydrolysed with the hydrochloric acid present in excess to form boron trichloride and hydrogen; this can easily be proved by measuring the hydrogen which is formed in accordance with the equations:

$$2BH_3 \cdot N(C_2H_5)_3 + 2HCl \rightarrow B_2H_6 + 2N(C_2H_5)_3 \cdot HCl$$
$$[B_2H_6] + 6HCl \rightarrow 2BCl_3 + 6H_2$$

*Example 12*

$$H_3B \cdot N(CH_3)_2(C_6H_5) + F_3B \cdot O(C_4H_9)_2 \rightarrow$$
$$\tfrac{1}{2}B_2H_6 + F_3B \cdot NR_3 + OR_2$$

135 g. (1 mol) of N-dimethyl phenyl borazane are heated to 60–80° C. with exclusion of air and moisture in a 750 cc. three-necked flask (thermometer, dropping funnel stirrer), to which is connected a reflux condenser and a low temperature trap (−190° C.). While stirring well, 198 g. (1 mol) of boron fluoride di-n-butyl etherate are run in over a period of about 1 hour from the dropping funnel. Diborane is immediately liberated and condenses in the low temperature trap. After the dropwise addition, the temperature is raised to 100–120° C. and nitrogen or argon is conducted through the complete apparatus. The yield of diborane is 13 g., this being substantially quantitative when calculated on the N-dimethyl phenyl borazane which is introduced.

What we claim is:

1. Process for the production of diborane, which comprises reacting borazane of the general formula $BH_3NR_3$, in which R is a member selected from the group consisting of alkyl, alkaryl, and aryl' radicals with a Lewis acid selected from the group consisting of boron halides, etherates of boron halides and aluminum trichloride, and thereby forming diborane.

2. Process according to claim 1 in which said reaction is effected under vacuum.

3. A process according to claim 1 in which said Lewis acid is boron fluoride.

4. A process according to claim 3 in which the reaction is effected by introducing said boron fluoride in gaseous form in amount up to the stoichiometric quantity.

5. A process according to claim 4 in which the gaseous boron fluoride is introduced in an amount of about 90% of the stoichiometric quantity.

6. Process according to claim 1 in which said reaction is effected in the presence of a solvent selected from the group consisting of ethers, hydrocarbons, and tertiary amines.

7. Process according to claim 1 in which the diborane produced is driven off in gaseous form and compressed.

8. Process according to claim 1 in which the diborane produced is driven off in gaseous form and condensed.

9. Process according to claim 1 in which the diborane produced is driven off by heating and recovered.

References Cited in the file of this patent

UNITED STATES PATENTS

| | | |
|---|---|---|
| 2,533,696 | Schaeffer et al. | Dec. 12, 1950 |
| 2,543,511 | Schlesinger et al. | Feb. 27, 1951 |
| 2,711,946 | Schechter et al. | June 28, 1955 |
| 2,737,447 | Elliot | Mar. 6, 1956 |

OTHER REFERENCES

Schlesinger et al.: "Chemical Reviews," vol. 31, pages 15–22 (August 1942).

Koster et al.: "Angewandte Chemie," vol. 69, pages 94–95 (February 7, 1957).

Gmelin: "Handbuck der Anorganischen Chemie," 8th Edition, System No. 13, 1954, pages 100, 101, 235, 245 and 246.

Shaeffer et al.: "Journal of The American Chemical Society," vol. 71, pages 2143–2145 (June 1949).

Schlesinger et al.: "Journal of The American Chemical Society," vol. 75, pages 186–190 (January 5, 1953).